Patented Feb. 17, 1948

2,436,287

UNITED STATES PATENT OFFICE 2,436,287

CONVERSION OF METHANOL TO FORMALDEHYDE

Willis Frank Brondyke, Morgantown, and Joseph Armand Monier, Jr., Charleston, W. Va., assignors to E. I. du Pont de Nemours & Company, Wilmington, Del., a corporation of Delaware No Drawing. Application April 15, 1943, Serial No. 483,184

17 Claims. (Cl. 260—603)

This invention relates to a process for the catalytic oxidation of methanol to formaldehyde and particularly to improved methods for conducting the reaction.

A number of processes have been employed for the preparation of formaldehyde since its discovery by A. W. Hofmann but the commercial processes which have been utilized comprise to a large extent the catalytic oxidation or dehydrogenation of methanol in the presence of suitable catalysts therefor. The invention of the instant case is directed principally to the catalytic conversion of methanol to formaldehyde, the catalyst being present in the reduced state or as an oxide of a metal or a mixture of metals or their oxides. The catalysts in the reduced state may be illustrated by the well-known copper and silver gauze catalysts of the art while the oxide catalysts may be exemplified by the molybdenum oxide and/or tungsten oxide catalysts either promoted or not with such oxides as vanadium or iron.

Processes heretofore employed for the oxidation of methanol utilizing the reduced metals as catalysts have been generally carried out under such conditions that all of the oxygen introduced with the methanol into the reaction has been used up by the reaction so that in effect the catalyst has been under reducing conditions and consequently retained its reduced state. The metal oxide type catalysts (which will hereinafter be referred to as oxide catalysts) have been utilized preferably with an excess of air or oxygen over and above that required to convert the methanol to formaldehyde.

It is known that in this synthesis a large excess of air—five to ten times the amount theoretically required for complete oxidation—is commonly used. This excess of air is necessary in the art as practiced in order to insure a safe methanol concentration outside the range of inflammability for oxygen and methanol and thereby eliminate the possibility of operating in the hazardous explosive range. Such a procedure requires equipment capable of handling huge quantities of gas consequently making the power requirements high and the equipment unwieldy.

It is also known that during the recovery of the synthesized formaldehyde by water scrubbing a portion of the formaldehyde and unconverted methanol as well as other organics are lost in the scrubber exit gases which are vented to the atmosphere. The amount of organics lost by this source increases with the concentration of the formaldehyde solution withdrawn from the base of the water scrubber and to the gas to water ratio during the scrubbing operation. Thus in the production of 40% aqueous "Formalin" solutions, as commonly practiced in the prior art, the losses in the exit gases are practically negligible. As the formaldehyde concentration is increased the organic losses also are increased markedly, since the gas to water ratio is higher as a result of the addition of less water to the scrubber. In the case of a 60% formaldehyde solution these losses are in the order of 4–8%. Losses of this magnitude are unavoidable in the practice of the art are previously revealed inasmuch as they cannot be minimized by the obvious expedient of decreasing the amount of air per unit of methanol since this would increase the methanol concentration into the inflammability zone and create a very hazardous operating condition.

An object of the present invention is to provide an improved process for the catalytic oxidation of methanol to formaldehyde. Another object of the invention is to provide a highly efficient process for the conversion of methanol to formaldehyde.

Still another object is to provide a process for the oxidation of methanol to formaldehyde in which the latter product may be recovered in a more concentrated aqueous solution than is commonly practiced, with a minimum loss of organic materials vented to the atmosphere.

It is a further object to provide means whereby the methanol concentration may be increased in the converter feed gases without encountering the hazards inherent in the process as previously disclosed. Yet another object is to provide means of controlling the reaction in order to sustain the activity of the catalyst, inhibit gas explosions, and greatly increase the quantity of formaldehyde producible by a given formaldehyde conversion unit. Other objects and advantages of the invention will hereinafter appear.

In accord with the invention it has been found that a given unit for the catalytic oxidation of methanol to formaldehyde will produce greater amounts of formaldehyde uncontaminated with methanol and will produce formaldehyde without danger of gas explosions and periodic shut-downs due to run-away reactions and catalyst failures if the reaction is conducted with an oxygen concentration which, irrespective of the methanol concentration, is below the explosive range.

In carrying out the invention the temperature of the methanol oxidation may vary within fairly wide limits depending particularly upon the type of catalyst employed and the activity of that catalyst. Ordinarily the temperature of the reaction may vary from about 225 to 500° C. When a catalyst such as the oxide of molybdenum is used, promoted, for example, with an oxide of vanadium, the optimum temperatures are between 325 and 400° C. It is to be distinctly understood, however, that while a wide range of temperatures may be employed for the over-all synthesis the range for any given catalyst may be rather limited. For optimum oxygen concentrations with optimum effluent gas concentration, more fully particularized hereinafter, ranging down to approximately 2% or lower by volume, temperatures for a given catalyst should not be allowed to drop from the optimum range more than 5 to 10°, for under such conditions a runaway side reaction may result. On the other hand, if higher effluent concentrations of oxygen are employed, say in the proximity of 4 to 6% by volume, somewhat greater latitude of temperatures below the optimum temperature for the particular catalyst may be used without danger of run-away secondary reactions.

One of the principal features of the invention involves conducting the reaction with an oxygen content below the explosive limit. It has been found that if the volume percent of oxygen in the gas employed for oxidation, and before the introduction of the methanol, is held below approximately 10.9%, no explosion will occur no matter how much methanol is added to the resulting mixture. This is contrary to the teachings of the art, with respect to formaldehyde synthesis, for that art in order to obtain high output shows use of air principally as the source of oxygen and as air contains approximately 20.9% by volume oxygen, the air to methanol is generally fixed on a weight basis at a ratio in the order of 14 to 1. If the methanol concentration is increased appreciably above the air to methanol ratio of 14 to 1, the resulting mixture is within the explosive range and due to the high temperatures of the reaction an explosion frequently results. Accordingly the art was restricted in the amount of methanol that could be added to the reaction.

The danger, in the formaldehyde synthesis, under known operating conditions was, therefore, the ever present explosion hazard which, with air, was present if the methanol concentration increased even fractionally above the 14:1 air to methanol ratio. By the present invention this danger has been eliminated by maintaining the oxygen content of the gas below 10.9 volume percent before the addition of the methanol.

A surprising and unexpected result emanates from this discovery, namely, that the capacity of a given unit can be increased as much as 180% and actually 30 to 75% increases can be readily attained.

The increase in capacity is attributable to the fact that, in accord with the processes of the prior art, the gas to methanol ratio was maintained at approximately 14 to 1 or at a higher ratio using air as the oxygen-containing gas while in accord with the instant case the ratio can be considerably lowered. Inasmuch as the methanol present in such a gaseous mixture, if all oxidized to formaldehyde, would not consume appreciably more than 15% of the oxygen present, a large volume of gas had to be passed through the converter and scrubbers in order to effect this comparatively small utilization of the oxygen present. The 14 to 1 ratio could not be lowered, for by decreasing the ratio the explosive range was quickly reached.

By operating, however, under the conditions prescribed by the instant case; namely, with an oxygen concentration of not more than 10.9 volume percent, the methanol can be increased with respect to the total gas (oxygen and inerts) until substantially all of the oxygen employed is consumed in oxidizing the methanol to formaldehyde.

The increased capacity is quite apparent when it is appreciated that, under the conditions of the art, using for example a 14 to 1 air to methanol ratio, only about 15% of the oxygen can be consumed, while under the conditions of the instant case, most of the oxygen entering can be consumed for the reason that there is no restriction on the amount of methanol that can be introduced with the oxygen. Arithmetically stated, a unit having a gas capacity of 21,000 pounds per hour, using a 14 to 1 gas (carrying 20.9 volume percent oxygen) to methanol ratio, because of the explosive hazards can consume only 1500 pounds per hour of methanol. If, on the other hand, a gas to methanol ratio, say, in the order of 10 to 1, is employed, (the gas carrying less than 10.9 volume percent oxygen) it is possible to oxidize 2100 pounds per hour of methanol, a 40% increase in capacity for this particular unit, while with a 7 to 1 ratio (the gas carrying less than 10.9 volume percent oxygen (3000 pounds of methanol per hour can be oxidized with an increased capacity of approximately 100% and with a 5:1 ratio (the gas carrying less than 10.9 volume percent oxygen) 4200 pounds of methanol can be oxidized with an increased capacity of approximately 180%.

The above considerations deal principally with the upper limit of oxygen which may be used. When operating with non-oxidized metal catalysts, such as silver gauze, copper and the like, there appears to be little or no lower limit to the oxygen concentrations. However, when oxide catalysts are employed there appears to be a lower limit below which serious operating difficulties are encountered. This limit varies between approximately 2 and 5%, depending upon the type of oxide catalyst employed and it is preferable when operating with these catalysts and particularly when operating with a molybdenum oxide and/or tungsten oxide catalyst activated or not with vanadium oxide or iron oxide to maintain the lower limit of oxygen at between approximately 2 to 5 volume percent. The percentage oxygen in this instance, of course, is determined in the effluent gas leaving the methanol-formaldehyde converter while the maximum oxygen permissible discussed above is determined by the amount present in the gases entering the methanol-formaldehyde converter.

As has been stated the methanol concentration which may be employed under the above restricted conditions is not critical with respect to the operability of the process. With respect to the amount of formaldehyde produced by a given formaldehyde unit, however, it is of considerable importance, for when the oxygen concentration on a volume basis is below the critical amounts namely 10.9 volume percent, the methanol may be increased up to that point where the effluent gas issuing from the converter contains the above designated amounts of oxygen, 2 to 5% with the oxide catalysts. Inasmuch as the yield of methanol to formaldehyde is excellent under the above operating conditions, in the order of 91 to 96%, the amount of methanol introduced can be substantially stoichiometrically calculated so that its conversion to formaldehyde will consume all but the minimum quantities of oxygen which should be discharged from the converter.

Various methods may be employed for providing these optimum gas ratios such, for example, as using a mixture of oxygen and nitrogen, air and nitrogen, or oxygen and some other inert gas such, for example, as boiler house gases free from carbon particles, tars, and the like; or any other suitable inert gas or mixture thereof. By this means it is possible to control the amount of oxygen and inerts introduced into the converter. Heretofore no difficulties in control of oxygen content of inlet gas were encountered because of the fact that air was used as the source of oxygen and it was used with its normal oxygen content.

Another feature of the instant case resides in the utilization of a purging step whereby the regulation of the amount of spent gases purged from the system (exhausted to the atmosphere) makes it possible to control the oxygen concentration below the explosive limit. By this method the gases issuing from the converter after being scrubbed with water for the removal of formaldehyde and other by-product materials contained, are recycled to the converter, the amount of gas recycled being regulated by purging a portion of it to the atmosphere. Inasmuch as additional oxygen is required for the reaction, this is supplied by make-up air which, together with the oxygen recycled, gives the desired amount of oxygen introduced into the converter. By this means a delicate and easy control of the oxygen concentration is provided.

It has likewise been discovered that if the exit gases after water scrubbing are recirculated back through the converter system, a yield and capacity increase is realized above that common in the prior art. The portion of the exit gas recycled may vary from 1% to 90% with varying concentrations of methanol in the converter feed gases without adverse effect on the activity of the catalyst. It was also discovered that the by-product losses in the scrubber exit gases, especially formaldehyde and methanol, could be decreased with increase in the amount of gas recycled under essentially the same scrubbing conditions. It has been found that if approximately 85% of exit gases are recirculated the oxygen content of the converter inlet gas will be lowered to an equilibrium value somewhere between 7 and 9% by volume. Since this is below the experimentally determined figure of 10.9% by volume, below which no mixture with methanol will propagate flame, the methanol content of the vapors can be increased radically without danger of explosion and without, in so far as we know, impairment of the activity of the catalyst.

The recycling system may be utilized in such a way that the recycled gas contains the minimum value of oxygen desired in the system, while the air introduced into the system provides all of the oxygen consumed in converting the methanol to formaldehyde as well as the oxygen purged from the system. By this method it is possible to control the reaction at an extremely high rate of conversion, to eliminate shut-downs due to run-away reactions and catalyst degradation and to provide a maximum output of formaldehyde from a given conversion unit.

The oxidation of methanol to formaldehyde is carried out in accord with the invention in a continuous manner. It is, however, necessary to build up within the system the conditions which make it possible to so carry out the reaction. This is accomplished by introducing into the reaction zone a mixture of methanol and air with a weight ratio of 14:1 or higher amounts of air. The converter prior to the admission of the gaseous mixture is charged, for example, with molybdenum oxide promoted with iron oxides as the catalyst for the reaction and brought up to a temperature by suitable heating means. The gases issuing from the converter are then passed into a scrubber for the removal of the formaldehyde formed, the scrubber gases recycled to the converter and this series of operations continued until the oxygen content of the gases, other than methanol, has dropped to at least 10.9 volume percent, for practical and safe operation to about 9½%, although with very accurate control of oxygen content, the limit of 10.9% can be more closely approached. The methanol concentration is then increased to the desired value while holding the oxygen concentration of the inlet gas, by increasing the purge to the atmosphere.

When the above conditions have been established continuous operation is carried out as described in the Examples 1, 2 and 3, which, together with Examples 4 and 5, illustrate preferred embodiments of the invention.

*Example 1.*—After starting the process as above described, the reaction is continued by passing 100 pounds of methanol per hour into the reaction converter simultaneously with the introduction of 250 lbs. per hour of air and 750 lbs. per hour of recycled gas. The spent gases issuing from the water scrubbing operation are recycled after purging 200 lbs. of recycled gas per hour from the system. By operating in this manner the oxygen in the purged gas and in the recycled gas is approximately 3.6 volume percent and that introduced into the converter is approximately 7.88 volume percent. By operating in this manner substantially 95% of the methanol is converted to formaldehyde and the process operates smoothly without frequent shut-downs due to run-away reactions, catalyst degradation and explosive difficulties.

*Example 2.*—The reaction is conducted substantially in accord with the process described in Example 1 by passing 100 lbs. of methanol per hour into the converter simultaneously with the introduction of 290 lbs. of air and 910 lbs. of recycled gas at the same rate. In accord with this procedure the gas purged is approximately 240 lbs. per hour and its oxygen content approximately 6.4 volume percent which is likewise the oxygen content of the recycled gas. The gases entering the converter which have a ratio of approximately 12:1 of inlet gas to methanol contain 9.88 volume percent oxygen. By this process formaldehyde is obtained at an approximately 25% greater amount per hour than when the same conversion unit is operated with air with a gas to methanol ratio of approximately 12:1 and without recycling.

*Example 3.*—Into the converter described and operated substantially in accord with the process of Example 1, 100 lbs. of methanol, 270 lbs. of air and 1130 lbs. of recycled gas are passed per hour, the spent gases after scrubbing being recycled and approximately 220 lbs. thereof purged from the system per hour. As a result of operating under these conditions the percent oxygen in the purged and recycled gas is approximately 5.1% by volume and the percent oxygen in the gas entering the converter 8.15 percent on the same basis giving an inlet gas to methanol ratio of approximately 14:1. Smooth operation over a long period and excellent utilization of methanol and catalyst are utilized.

Example 4.—A mixture composed of 14 parts by weight of a gas, containing from 21 to 5% by volume of oxygen, and 1 part by weight of methanol is continuously drawn into a converter charged with a catalyst composed of molybdenum and iron oxides at a temperature of 250–500° C. The depth and diameter of the catalyst bed can vary but for purposes of this example 24" tubes 1" in diameter containing about 11" of catalyst were used. The methanol is oxidized to formaldehyde and the resulting hot vapors are scrubbed with water to recover the formaldehyde. Enough water is added to the top of the scrubber to yield a 60% formaldehyde solution in the base. The exit gas from this scrubber contains unused oxygen, unreacted methanol, unrecovered formaldehyde, by-product gases such as CO and $CO_2$, other by-products and inert gas which is mainly nitrogen. Approximately 85% of this exit gas is recirculated with make-up fresh air and methanol into the converter and the process repeated continuously. If 85% is recirculated the oxygen content of the inlet gas will drop to an equilibrium value of approximately 9% by volume, since the oxygen concentration in the recirculated gas is less than that in the make-up air. If 60% formaldehyde is produced in the base of the scrubber, the increased recovery of organics as the direct result of recirculation of the exit gases will effect an increase in the yield of methanol to formaldehyde of about 5%.

Example 5.—The conditions described in Example 1 are maintained the same for this example except that the ratio of inlet gas to methanol is lowered from 14 to 1 to 10 to 1 by increasing the quantity of methanol in the feed to the converter approximately 50% while maintaining the same safe oxygen concentration (9% by volume) in the inlet gas. The same yield savings are realized as described in Example 1 with an increase in production capacity of at least 50%. It should be understood that the gas to methanol ratio can be varied at will as long as there is sufficient oxygen for complete conversion of the methanol to formaldehyde and as long as the oxygen in the inlet gas is maintained at some safe concentration outside the inflammability range. Therefore, if the oxygen level of the inlet gas is carried at a 9% by volume level, a gas to methanol ratio of 5:1 is theoretically obtainable.

Another feature of the invention which will be appreciated by those skilled in this art is that during operation with recirculation, the recirculated gas is saturated with respect to water which is not true of the make-up air, i. e. when air is used alone, during a once-through operation. The presence of this moisture appears to have, contrary to what would be expected, a favorable influence on the catalyst temperature whereby control of the process is facilitated.

The phrase "a gas containing oxygen" as employed in the claims shall be taken to describe air, or any gaseous mixture containing free or molecular oxygen with an inert gas such as nitrogen.

We claim:

1. In a process for producing formaldehyde by the catalytic oxidation of methanol wherein methanol and a gaseous mixture containing oxygen are passed through a reaction zone, the reactant gases scrubbed with water and returned with additional methanol and air to the reaction zone, the improvement which comprises conducting the reaction in the presence of an oxide catalyst, controlling the oxygen content of the reaction mixture by recycling spent gases containing approximately 2–5% oxygen, introducing air into the reaction in amounts sufficient to provide with the recycled gases not more than 10.9% oxygen based on the volume percent of the gaseous mixture and including in the 10.9% oxygen all of the oxygen consumed by the conversion of the methanol to formaldehyde and the amount of oxygen purged, the gaseous mixture : methanol ratio, on a weight basis, being richer in methanol than 14:1.

2. In a process for the production of formaldehyde by the catalytic oxidation of methanol, the steps which comprise passing methanol and the oxidizing gas into a reaction zone containing an oxide-catalyst, the ratio of gas to methanol being approximately between 7:1 and 14:1, passing the spent gases from the reaction zone through water scrubbers wherein the formaldehyde formed is separated and returning the washed spent gases to the reaction after separating therefrom by purging to the atmosphere a sufficient amount of spent gas to maintain the oxygen concentration of the gas entering the converter prior to the addition of the methanol below 10.9 volume percent.

3. In a process for the production of formaldehyde by the catalytic oxidation of methanol, the improvement which comprises conducting the reaction and using the reactants in substantially the proportionation of inlet and outlet rates of flow of the constituents characterized by passing into a reaction zone recycled gas, approximately 100 lbs. of methanol and 250 lbs. of air per hour, passing the spent gases from the reaction zone into a scrubber for the removal of formaldehyde, purging substantially 200 lbs. per hour of the spent and scrubbed gases and recycling 750 lbs. per hour to the reaction.

4. In a process for the production of formaldehyde by the catalytic oxidation of methanol, the improvement which comprises conducting the reaction and using the reactants in substantially the proportionation of inlet and outlet rates of flow of the constituents characterized by passing into a reaction zone recycled gas, approximately 100 lbs. of methanol and 290 lbs. of air per hour, passing the spent gases from the reaction zone into a scrubber for the removal of formaldehyde, purging substantially 240 lbs. per hour of the spent and scrubbed gases and recycling 1130 lbs. per hour to the reaction.

5. In a process for the production of formaldehyde by the catalytic oxidation of methanol, the improvement which comprises conducting the reaction and using the reactants in substantially the proportionation of inlet and outlet rates of flow of the constituents characterized by passing into a reaction zone recycled gas, approximately 100 lbs. of methanol and 270 lbs. of air per hour, passing the spent gases from the reaction zone into a scrubber for the removal of formaldehyde, purging substantially 220 lbs. per hour from the spent and scrubbed gases and recycling 910 lbs. per hour to the reaction.

6. In a process of producing formaldehyde by the catalytic oxidation of methanol the improvement which comprises: subjecting methanol to catalytic oxidation by a gaseous mixture of oxygen and an inert gas, the oxygen content of the gaseous mixture being below about 10.9 volume percent oxygen, based on the oxygen and inert gas, the gaseous mixture : methanol ratio, on a weight basis, being richer in methanol than 10:1.

7. In a process of producing formaldehyde by the catalytic oxidation of methanol the improvement which comprises: subjecting methanol to catalytic oxidation by a gaseous mixture of oxygen and an inert gas, the oxygen content of the gaseous mixture being below 10.9 volume percent oxygen, based on the oxygen-inert gas content, the gaseous mixture : methanol ratio, on a weight basis, being approximately 7:1.

8. In a process of producing formaldehyde by the catalytic oxidation of methanol the improvement which comprises: subjecting methanol to catalytic oxidation by a gaseous mixture of oxygen and an inert gas, said mixture carrying no more than 10.9 volume percent oxygen, the gaseous mixture : methanol ratio, on a weight basis, being richer in methanol than 14:1, there being present sufficient oxygen to oxidize substantially all of the methanol to formaldehyde.

9. In a process of producing formaldehyde by the catalytic oxidation of methanol the improvement which comprises: subjecting methanol and a gaseous mixture of oxygen, and an inert gas to a temperature between 225 and 500° C. and to contact with a methanol oxidation catalyst, the oxygen content of the gaseous mixture constituting less than 10.9 volume percent of the oxygen and the weight ratio of gaseous mixture : methanol being richer in methanol than 14:1, there being present sufficient oxygen to oxidize substantially all of the methanol to formaldehyde.

10. In a process of producing formaldehyde by the catalytic oxidation of methanol the steps which comprise passing into a reaction zone containing a methanol oxidation catalyst, vaporized methanol and an oxygen-inert gas mixture carrying no more than 10.9 volume percent of oxygen on a gas : methanol weight basis, the weight ratio of gaseous mixture : methanol being richer in methanol than 14:1 and oxidizing the methanol therein to formaldehyde, there being present sufficient oxygen to oxidize all of the methanol to formaldehyde.

11. The process in accord with claim 10 in which the methanol introduced consumes, in being oxidized to formaldehyde, all of the oxygen down to an exit gas containing from 2 to 5 volume percent oxygen.

12. The process in accord with claim 10 in which the methanol introduced consumes, in being oxidized to formaldehyde, all of the oxygen down to an exit gas containing about 3 volume percent oxygen.

13. In a process of producing formaldehyde by the catalytic oxidation of methanol, the improvement which comprises passing into a reaction zone methanol vapors and an oxygen nitrogen gaseous mixture to give a gaseous mixture : methanol ratio on a weight basis between 5:1 and 14:1, the gaseous mixture containing no more than 10.9 volume percent oxygen but sufficient oxygen to give an exit gas containing from 2 to 5% oxygen and catalytically oxidizing all the methanol therein to formaldehyde.

14. In a process of catalytically oxidizing methanol to formaldehyde, the steps which comprise conducting the oxidation by a process, in which an oxidizing gas is used containing no more than about 10.9 volume per cent oxygen and in which the gaseous mixture : methanol ratio is richer in methanol than 14:1, wherein the formaldehyde is stripped from the spent oxidation reaction gases and the stripped gases after purging a part thereof and after the addition of air are employed as the oxidizing gas.

15. In a process of catalytically oxidizing methanol to formaldehyde, the steps which comprise conducting the oxidation by a process, in which an oxidizing gas is used containing no more than 10.9 volume percent oxygen and in which the gaseous mixture : methanol ratio is about 10:1, in which the formaldehyde produced is stripped from the spent oxidation reaction gases and after purging a part of the stripped gases, adding air thereto and returning the resulting mixture to the reaction.

16. In a process of producing formaldehyde by the catalytic oxidation of methanol, the steps which comprise subjecting methanol to catalytic oxidation by a gaseous mixture of oxygen and an inert gas, said mixture carrying no more than 10.9 volume percent oxygen, and carrying 2 to 5% oxygen over and above the oxygen content necessary to oxidize all of the methanol to formaldehyde, the gaseous mixture : methanol ratio, on a weight basis, being richer in methanol than 14:1.

17. In a process of producing formaldehyde by the catalytic oxidation of methanol, the steps which comprise subjecting methanol to catalytic oxidation by a gaseous mixture of oxygen and an inert gas, and by passing the gaseous mixture of oxygen and the inert gas continuously into a reaction zone, said mixture carrying no more than 10.9 volume percent oxygen, and the gaseous mixture : methanol ratio on a weight basis being richer in methanol than 14:1, there being present sufficient oxygen to oxidize all of the methanol introduced, and continuously discharging from the reaction zone formaldehyde substantially free from methanol and a gaseous mixture containing from about 2 to about 5% oxygen.

WILLIS FRANK BRONDYKE.
JOSEPH ARMAND MONIER, JR.

REFERENCES CITED

The following references are of record in the file of this patent:

UNITED STATES PATENTS

| Number | Name | Date |
| --- | --- | --- |
| 1,729,711 | Curme | Oct. 1929 |
| 1,941,010 | James | Dec. 26, 1933 |
| 2,065,394 | Bunnett | Dec. 27, 1936 |
| 2,204,652 | Bludworth | June 18, 1940 |
| 2,320,253 | Arnold | May 25, 1943 |